US012550865B2

United States Patent
Brown et al.

(10) Patent No.: US 12,550,865 B2
(45) Date of Patent: *Feb. 17, 2026

(54) ANIMAL LITTERS EXHIBITING REDUCED ADHESION PROPERTIES, AND RELATED METHODS

(71) Applicant: Church & Dwight Co., Inc., Princeton, NJ (US)

(72) Inventors: Raymond S. Brown, Bridgewater, NJ (US); Richard D. Miller, Union Beach, NJ (US); Roger Bruno, Beachwood, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 459 days.

This patent is subject to a terminal disclaimer.

(21) Appl. No.: 17/680,951

(22) Filed: Feb. 25, 2022

(65) Prior Publication Data

US 2022/0174907 A1    Jun. 9, 2022

Related U.S. Application Data

(63) Continuation of application No. 15/696,921, filed on Sep. 6, 2017, now Pat. No. 11,284,600.

(60) Provisional application No. 62/384,330, filed on Sep. 7, 2016.

(51) Int. Cl.
| | | |
|---|---|---|
| A01K 1/01 | (2006.01) | |
| A01K 1/015 | (2006.01) | |
| B01J 20/16 | (2006.01) | |
| B01J 20/24 | (2006.01) | |
| B01J 20/28 | (2006.01) | |

(52) U.S. Cl.
CPC .......... *A01K 1/0154* (2013.01); *A01K 1/0155* (2013.01); *B01J 20/16* (2013.01); *B01J 20/24* (2013.01); *B01J 20/28016* (2013.01); *B01J 20/28059* (2013.01)

(58) Field of Classification Search
CPC .. A01K 1/0152; A01K 1/0154; A01K 1/0155; B01J 20/28059
See application file for complete search history.

(56) References Cited

U.S. PATENT DOCUMENTS

| | | |
|---|---|---|
| 4,471,717 A | 9/1984 | Lander |
| 5,101,771 A | 4/1992 | Goss |
| 5,188,064 A | 2/1993 | House |
| 5,303,676 A | 4/1994 | Lawson |
| 5,359,961 A | 11/1994 | Goss et al. |
| 5,421,291 A | 6/1995 | Lawson et al. |
| 5,634,431 A | 6/1997 | Reddy et al. |
| 5,645,013 A | 7/1997 | Redmond |
| 5,806,462 A | 9/1998 | Parr |
| 6,053,125 A | 4/2000 | Kory et al. |
| 6,676,954 B2 | 1/2004 | Dai et al. |
| 6,803,033 B2 | 10/2004 | McGee et al. |
| 6,962,129 B1 | 11/2005 | Lawson |
| 7,429,421 B2 | 9/2008 | Greene et al. |
| 7,757,638 B2 | 7/2010 | Wang et al. |
| 8,074,604 B2 | 12/2011 | Swank |
| 8,356,578 B2 | 1/2013 | Jenkins et al. |
| 8,522,720 B2 | 9/2013 | Boxley et al. |
| 8,720,375 B2 | 5/2014 | Miller et al. |
| 9,185,878 B2 | 11/2015 | Kuras et al. |
| 2006/0201438 A1 | 9/2006 | Anttila et al. |
| 2008/0223302 A1 | 9/2008 | Wang et al. |
| 2009/0000562 A1 | 1/2009 | Jenkins et al. |
| 2009/0255478 A1 | 10/2009 | Wadams et al. |
| 2010/0247479 A1 | 9/2010 | Mackert et al. |
| 2011/0033576 A1 | 2/2011 | Yiannikouris et al. |
| 2011/0185977 A1 | 8/2011 | Dixon et al. |
| 2012/0024235 A1* | 2/2012 | Boxley ............ B01J 20/16 119/171 |
| 2013/0180459 A1 | 7/2013 | Zhang |
| 2013/0199456 A1 | 8/2013 | Bracilovic et al. |
| 2013/0269623 A1 | 10/2013 | Lawson |
| 2013/0305997 A1 | 11/2013 | Miller et al. |
| 2013/0312668 A1 | 11/2013 | Boxley et al. |
| 2015/0040833 A1 | 2/2015 | Kornmayer et al. |
| 2016/0014993 A1 | 1/2016 | Goff |
| 2016/0044891 A1 | 2/2016 | Kuras et al. |
| 2018/0343824 A1 | 12/2018 | Hayes et al. |

FOREIGN PATENT DOCUMENTS

| | | |
|---|---|---|
| CA | 2799113 | 12/2012 |
| CN | 104938344 | 9/2015 |
| EP | 0453414 | 10/1991 |

(Continued)

OTHER PUBLICATIONS thecatsite.com "Non-Stick Cooking Spray in a Litter Box?", https://thecatsite.com/threads/non-stick-cooking-spray-in-a-litter-box145564/ (website), Oct. 19, 2007.

*Primary Examiner* — Son T Nguyen
(74) *Attorney, Agent, or Firm* — Church & Dwight Co., Inc.

(57) ABSTRACT

An animal litter composition having reduced adhesive properties, and a related method, are disclosed. The animal litter can include a clay-based liquid absorbing material, a filler including one or both of the following: a non-absorbent, non-soluble substrate; an absorbent substrate, and at least one oil present in an amount such that the animal litter composition has a total oil content of about 1.0% by weight to about 7.5% by weight based on the total weight of the animal litter composition.

19 Claims, No Drawings

(56) References Cited

FOREIGN PATENT DOCUMENTS

| WO | WO 2010/057124 | 5/2010 |
| WO | WO 2012116822 | 9/2012 |
| WO | WO 2013/021406 | 2/2013 |

* cited by examiner

ANIMAL LITTERS EXHIBITING REDUCED ADHESION PROPERTIES, AND RELATED METHODS

CROSS-REFERENCE TO RELATED APPLICATIONS

The present application is a continuation of U.S. patent application Ser. No. 15/696,921, filed Sep. 6, 2017, which claims priority to U.S. Provisional Patent Application No. 62/384,330, filed Sep. 7, 2016, which are incorporated by reference herein in their entireties.

FIELD OF THE DISCLOSURE

The present disclosure relates to an absorbent composition and its method of production, as well as its use as an animal litter. More particularly, the absorbent composition is configured for reduced adhesion to surfaces when wetted.

BACKGROUND

Various types of litters have been used for many years in the area of pet care to provide a dedicated location for housebroken animals, such as cats, to urinate and defecate indoors. Litters generally can be formed of a liquid-absorbing material, such as clay, to provide for efficient absorption of urine. Litters further can include a variety of added materials, such as clumping aids, fragrances, and the like. The most commonly used litter box liquid-absorbing materials are inexpensive clays, such as calcined clays, that are safe and non-irritating to the animals, and that absorb substantial amounts of liquids. Other porous, solid litter box absorbent materials, that are used alone or in combination, include straw, sawdust, wood chips, wood shavings, porous polymeric beads, shredded paper, sand, bark, cloth, ground corn husks, and cellulose. Each of these absorbent materials has the advantage of low cost. The entire contents of the litter box including the soiled and unsoiled liquid-absorbing materials will eventually be removed because of the offensive odor caused by the absorbed urine and feces.

Litter waste, which is the urine and/or feces deposited in the litter box, tends to adhere to sides of litter boxes when typical litters are employed. Currently clay soils or comminuted rocks, e.g. the sodium bentonites, are used in an attempt to improve litter compositions. Plant-based litters, such as those made from wood chips or corn, can also absorb liquid waste, and be made disposable with the aid of clumping agents, but, again, surface adhesion of the wetted litter (e.g., adhesion to the sides and bottoms of litter containers) remains a problem. Accordingly, there remains a need for improved animal litters that particularly exhibit reduced surface adhesion and thus improve the ease of removal of the soiled litter for disposal.

SUMMARY OF THE DISCLOSURE

The present disclosure relates to animal litter compositions having reduced adhesive properties, and related methods. In some aspects, an animal litter composition may comprise a clay-based liquid absorbing material, a filler comprising one or both of the following: a non-absorbent, non-soluble substrate; an absorbent substrate, and at least one oil present in an amount such that the animal litter composition has a total oil content of about 1% by weight to about 5% by weight based on the total weight of the animal litter composition. In one or more embodiments, the animal litter may be further defined in relation to one or more of the following statements, which may be combined in any number or order.

The animal litter can have a total oil content of about 1.7% by weight to about 6.0% by weight or about 1.5% by weight to about 3.0% by weight based on the total weight of the animal litter composition.

The animal litter can include the non-absorbent, non-soluble substrate and further comprise a clumping agent coated on the non-absorbent, non-soluble substrate.

The at least one oil can comprise at least one of mineral oil, silicone oil, grapeseed oil, and corn oil.

The clay-based liquid absorbing material can have a surface area of about 15 $m^2/g$ or less or can have a surface area of about 10 $m^2/g$ or less.

The clay-based liquid absorbing material can have an average particle size of about 0.1 mm to about 5 mm.

The animal litter composition can comprise: the clay-based liquid absorbing material in an amount of about 35% to about 55% by weight; the filler in an amount of about 40% to about 60% by weight, the filler being a non-absorbent, non-soluble substrate; the at least one oil present in an amount such that the animal litter composition has a total oil content of about 1.5% by weight to about 3.0% by weight; and at least one clumping agent in a total amount of about 0.3% by weight to about 5% by weight.

In some aspects, a method for producing an animal litter composition may comprise providing a clay-based liquid absorbing material and a filler comprising one or both of the following: a non-absorbent, non-soluble substrate; an absorbent substrate; and incorporating at least one oil with the clay-based liquid absorbing material and the filler in an amount such that the animal litter composition has a total oil content of about 1.5% by weight to about 7.0% by weight based on the total weight of the animal litter composition. In one or more embodiments, the method may be further defined in relation to one or more of the following statements, which may be combined in any number or order.

The animal litter composition can be prepared to have a total oil content of about 1.6% by weight to about 6.0% by weight or about 1.5% by weight to about 3.0% by weight based on the total weight of the animal litter composition.

The method can further comprise coating a clumping agent on the non-absorbent, non-soluble substrate prior to incorporating the at least one oil, wherein the filler comprises the non-absorbent, non-soluble substrate.

The at least one oil can comprise at least one of mineral oil, silicone oil, grapeseed oil, and corn oil.

The clay-based liquid absorbing material can have a surface area of about 15 $m^2/g$ or less or about 10 $m^2/g$ or less.

The clay-based liquid absorbing material can have an average particle size of about 0.1 mm to about 5 mm.

DETAILED DESCRIPTION OF THE DISCLOSURE

The present disclosure now will be described more fully hereinafter with reference to specific embodiments and particularly to the various drawings provided herewith. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a," "an," "the," include plural referents unless the context clearly dictates otherwise.

The present disclosure relates to a clay-based animal litter exhibiting reduced adhesion to surfaces when the litter is wetted. The clay-based animal litter can include a variety of components found in known litter compositions, such as clay-based particles, fillers, fragrance, clump aids, and the like. It has been found according to the present disclosure, however, that the inclusion of a defined amount of at least one oil to the clay-based animal litter is surprisingly effective in reducing adhesion to surfaces (such as the bottoms and sides of litter boxes and/or pans) when the litter is wetted, thereby resulting in easier litter waste removal from a litter box.

In one or more embodiments, a clay-based animal litter according to the present disclosure can comprise at least clay-based particles, one or more fillers, and a content of oil. Further, optional ingredients may also be included as further described herein. It is generally believed that oils should be mainly avoided in animal litters because they interfere with various, required properties of the litter, such as clumping and absorption. It has been surprisingly found herein, however, that a significant content of oil can be included in the animal litter without adverse effects. The addition of the oils provides the benefit of reduced adhesion of the wetted animal litter as described herein. A clay based liquid-absorbing material for use in an animal litter composition as described herein can include any such material previously recognized as useful in forming animal litters. Preferably, the clay-based liquid absorbing material is a naturally clumping clay. For example, a clay soil or comminuted rock containing at least one water swellable clay mineral (such as a montmorillonoid or smectite) can be used. More particularly, a comminuted bentonite, more preferably a sodium bentonite, which contains a preponderant amount of montmorillonite clay mineral, may be used as the clay-based liquid absorbing material in the present animal litter composition. Non-limiting examples of bentonite clays that can be used include sodium bentonite, potassium bentonite, lithium bentonite, calcium bentonite and magnesium bentonite, or combinations thereof. Clay-based liquid absorbing materials useful in the present animal litter compositions are further described in U.S. Pat. No. 8,720,375 to Miller et al., the disclosure of which is incorporated herein by reference.

In one or more embodiments, the performance of the present animal litter composition can relate to one or more properties of the clay-based material apart from its ability to absorb liquid. In some embodiments, performance can be improved though use of a clay-based material exhibiting a defined particle size range. For example, suitable clay-based materials can be provided with an average particle size of about 0.2 mm to about 5 mm, about 0.3 mm to about 4 mm, or about 0.5 mm to about 3 mm. In some embodiments, the surface area of each particle of the clay-based material may comprise a defined surface area that that has been found to maximize effectiveness of the animal litter composition in exhibiting reduced adhesion to surfaces when the litter is wetted. For example, particles of the clay-based material can have an average surface area that is less than 20 $m^2/g$, less than 15 $m^2/g$, or less than 10 $m^2/g$. In each of the foregoing ranges, it is understood that the particles preferably have a minimum surface area of at least 1 $m^2/g$. In some embodiments, the particles of the clay-based material can have an average surface of about 1 $m^2/g$ to about 20 $m^2/g$, about 2 $m^2/g$ to about 15 $m^2/g$, or about 3 $m^2/g$ to about 10 $m^2/g$. Surface area can be measured utilizing known methods, such as the Brunauer, Emmett, Teller ("BET") method wherein surface area is calculated using $N_2$ absorption. The above values, in some embodiments, thus may be referred to as the BET surface area.

The amount of the clay-based liquid absorbing material used in the present animal litter composition can vary. For example, the clay-based liquid absorbing material can form about 15% by weight to about 99.5% by weight of the composition. In further embodiments, the amount of the clay-based liquid absorbing material in the animal litter composition can be about 20% by weight to about 94% by weight, about 25% by weight to about 90% by weight, about 30% by weight to about 80% by weight, or about 35% by weight to about 55% by weight based on the total weight of the composition.

Fillers suitable for use in the present animal litter compositions can include a variety of materials that can be a non-absorbent, non-soluble substrate, or can be an absorbent substrate. In one or more embodiments, useful fillers can include absorbent substrates, such as non-clumping clays. Non-limiting examples of useful non-clumping clays include attapulgite, Fuller's earth, calcium bentonite, palygorskite, sepiolite, kaolinite, illite, halloysite, hormite, vermiculite or mixtures thereof. Suitable fillers according to the present disclosure also can include a variety of non-absorbent, non-soluble substrates, such as non-clay substances. Non-limiting examples of non-clay materials that can be used include zeolites, crushed stone (e.g., dolomite and limestone), gypsum, sand, calcite, recycled waste materials, and silica.

In some embodiments, it can be useful to provide the filler material in a form exhibiting specific characteristics. For example, it can be useful for the filler material to exhibit an average particle size that is approximately the same as the clay-based liquid absorbing material particles. In particular, the filler material may exhibit an average particle size that is +/−20%, +/−15%, +/−10%, or +/−5% of the average particle size of the clay-based liquid absorbing material particle size. In some embodiments, it likewise can be useful for the filler material to have an average surface area that is approximately the same as the surface area of the clay-based liquid absorbing material particles. The above tolerances thus likewise can apply to surface area.

The amount of the filler used in the present animal litter composition can vary. In some embodiments, filler may be expressly excluded (i.e., forming 0% of the litter composition). Preferably, the filler provides the balance of the animal litter composition after all other materials are included. As examples, the animal litter composition can comprise about 0% by weight to about 75% by weight, about 10% by weight to about 70% by weight, about 25% by weight to about 65% by weight, or about 40% by weight to about 60% by weight of the filler based on the total weight of the animal litter composition.

The animal litter composition also includes a quantity of oil that is effective to reduce adhesion of wetted litter on one or more surface of a litter box (e.g., the bottom of a litter box and/or the walls of a litter box). Small quantities of oil have been added to animal litters in the past, such as being used as a coating on a filler or clumping aid in order to reduce dusting of the composition. The conventional knowledge, however, has been that the amount of added oil should be minimized to avoid interference with the clumping activity and/or the absorption efficacy of the litter. It has been surprisingly found according to the present disclosure, however, that oils can be included in quantities that are significantly greater than previously believed possible without interfering with the further properties of the litter. Moreover, the increased oil content has been found to make the animal litter composition surprisingly effective in resisting adhesion to surfaces when the litter has been wetted. In this regard, it is understood that when an animal urinates in an animal litter, the liquid permeates the litter composition. For clumping litters, the spread of the liquid can be better localized; however, when the animal urinates in close proximity to a litter box wall (or when the litter box includes only a shallow depth of litter therein), the liquid permeates to the litter box wall and/or floor. Known litter compositions are plagued by the propensity of the thus wetted litter to tightly adhere or stick to the surfaces of the litter box (or other surface as the case may be). Diligent digging, scraping, and the like is often required to loosen the wetted litter from the surfaces, often leaving a residue that can retain unwanted odors in the litter.

The inclusion of oil addresses the above problem by reducing the adherence or adhesion of the wetter litter to the surfaces. As used herein, it is understood that referenced to an animal litter, exhibiting reduced adhesion or reduced adherence indicates a relationship between the wetted litter and a containing surface (e.g., a wall or floor surface of a litter box). Such terms should not be viewed as indicating that the clumping ability of the animal litter is reduced (when a clumping litter is being used). Rather, it is surprising to find that a clumping animal litter can retain excellent clumping ability while simultaneously exhibiting reduced adherence of the wetted litter to the containing surface. More particularly, oil may be included in a quantity such that adverse effects are not seen due to the substantially complete absorption of the oil into the surfaces of the clay-based particles. Such oils, however, can be displaced from the animal litter composition when wetted and form a barrier between the wetted litter and the containing surfaces. Although not wishing to be bound by theory, this effect is believed to be at least in part due to the higher natural affinity of the oil for a litter box surface (e.g., a plastic surface) versus the clay-based litter. The displaced oils thus may adhere to surfaces of the litter box and, in this manner, reduce or prevent the adhesion of wetted litter waste and provide for easier removal of litter waste (i.e., fecal matter and/or urine) during periodic cleaning of the litter box.

The amount of oil present in the animal litter composition can vary based upon one or more characteristics of the further components of the composition. In some embodiments, the total amount oil in the animal litter composition can be about 0.5% by weight to about 8% by weight, about 1.25% by weight to about 7.5% by weight, about 1.5% by weight to about 7% by weight, about 1.6% by weight to about 6.5% by weight, or about 1.7% by weight to about 6% by weight based on the total weight of the animal litter composition. In some embodiments, particularly beneficial results can be achieved when the total oil content is greater than 1% by weight, specifically greater than 1.25% by weight, and more specifically greater than 1.5% by weight based on the total weight of the animal litter composition. The maximum amount of oil present can vary, and preferably is no greater than 10% by weight, no greater than 9% by weight, or no greater than 8% by weight based on the total weight of the animal litter composition.

In some embodiments, the total amount of oil present in the animal litter composition may be configured to be determined relative to a surface area of the clay-based liquid-absorbing material and an amount of filler (i.e., non-clay substances). In some aspects, it has surprisingly been found that the anti-adhesion effects can be seen with a lower oil content, a lower clay-based liquid absorbing material content having a smaller surface area, and a higher filler content. In these aspects, the oil content may not detrimentally affect clumping and/or absorption of the animal litter composition, but may still significantly improve the anti-adhesion effects of the animal litter composition. Accordingly, in some embodiments, the amount of oil present can be varied by varying the surface area of the clay-based liquid absorbing material and/or varying the content of the clay-based liquid absorbing material as well as the content of the filler.

Several different types of oils may be used according to the present disclosure. For example, naturally derived oils as well as synthetically manufactured oils may be utilized. The type of oil used particularly may correlate to the hydrophobicity of the oil. Oils with a greater hydrophobicity can be preferred: Hydrophobicity of an oil may be characterized in various manners, such as through measurement of a diameter of a spread of a drop of aqueous liquid (e.g., deionized water, 2% sodium chloride to mimic cat urine, actual cat urine, etc.) on a surface covered with the oil, where a larger measurement indicates increased wetting and thus lower hydrophobicity. Other manners for characterizing hydrophobicity of an oil may include measurement of the contact angle of a drop of water on a surface covered with the oil. In some embodiments, non-limiting examples of oils that can be used include silicone oils, mineral oils, grapeseed oils, or corn oils.

In addition to the foregoing, the ability of a litter composition according to the present disclosure to exhibit reduced adhesion when wetted may also be affected by a type of base material (i.e., liquid absorbing material) used in the animal litter composition, a ratio of clumping agent to filler material to clay-based liquid absorbing material, and particle size of the clay-based liquid absorbing material.

In one or more embodiments, the animal litter composition may also include one or more clumping agents, or clump enhancing materials. Description of suitable clumping agents is provided in U.S. Pat. No. 8,720,375 to Miller et al., the disclosure of which is incorporated herein by reference. Useful clumping agents are those materials suitable to promote adhesion of the fine size particles of litter granules to each other as well as adhesion of the particles to form agglomerates when wetted. Preferably, the clumping agent allows the formation of a gelled agglomerate when exposed to a liquid, such as animal urine. A clumping agent may be provided in admixture (e.g., in particle form) with the further particles forming the animal litter. In some embodiments, the clumping agent can be provided as a coating on at least a portion of the other particles forming the animal litter (e.g., as a coating on at least a portion of the filler material). Such coatings may be provided by any known method, such as spraying.

Non-limiting examples of materials suitable for use as a clumping agent include naturally occurring polymers (e.g., naturally occurring starches, water soluble polysaccharides, and gums), semisynthetic polymers (e.g., cellulose derivatives, such as carboxymethyl cellulose), and sealants. Exemplary clumping agents include amylopectins, natural gums, and sodium carboxymethylcellulose. The amount of any clumping agent that is present in the animal litter composition can vary based upon the total composition. For example, it can be useful to include a greater amount of clumping agents when a greater amount of non-absorbent fillers is used. In some embodiments, clumping agents can be present in a total amount of 0.1% by weight to about 6% by weight, about 0.2% by weight to about 5.5% by weight, about 0.3% by weight to about 5% by weight, or about 0.5% by weight to about 4% by weight.

In addition to the foregoing, one or more further materials may be included in the present animal litter composition. Specifically, any conventional litter additive may be included to the extent that there is no interference with the ability of the litter composition to provide the useful effect of reduced adherence to surfaces when wetted. Non-limiting examples of additional materials that may be used include binders, preservatives, such as biocides (e.g., benzisothiazolinone, methylisothiazolone), de-dusting agents, fragrance, bicarbonates, and combinations thereof. Each of the foregoing materials separately may be included in any amount up to about 5% by weight, up to about 2% by weight, up to about 1% by weight, or up to about 0.5% by weight, such as about 0.01% by weight to about 5% by weight, to about 4% by weight, to about 3% by weight, to about 2% by weight, or to about 1% by weight based on the total weight of the animal litter composition. Further, it is understood that any one or more of such materials may be expressly excluded from the present animal litter composition.

In one or more embodiments, an animal litter composition according to the present disclosure providing reduced adhesion of litter to a surface when wetted (e.g., to surface(s) of a litter box) can include components in the ranges shown in TABLE 1 below.

TABLE 1

| Ingredients | Percentage (%) |
| --- | --- |
| Absorbent or non-absorbent filler | qs to 100% |
| Bentonite | 20 to 94% |
| Oil | 0.5 to 6% |
| Clump aids | 0 to 5% |
| Fragrance | 0 to 2% |
| Preservatives | 0 to 0.5% |
| Bicarbonate | 0 to 0.5% |

The advantages of an animal litter waste composition formulated using the exemplary formulation include easier litter waste removal, increase in odor blocking properties, full clump removal, etc. The animal litter compositions described herein may be used for a wide variety of animals and birds, e.g., uncaged household pets, such as cats and dogs, particularly puppies too young to be walked; caged pets, such as hamsters, gerbils and rabbits; caged laboratory animals, such as guinea pigs, mice, rats and monkeys; animals raised for fur, such as mink; barnyard birds, such as chickens, ducks and geese; and pet birds, such as parrots, parakeets, *canaries* and pigeons. The compositions of this invention are particularly suitable for use as cat litters.

A method for producing an animal litter composition is also disclosed herein. The method may comprise a first step of providing a clay-based liquid absorbing material and a filler comprising one or both of the following: a non-absorbent, non-soluble substrate; an absorbent substrate. The method may comprise a second step of incorporating at least one oil with the clay-based liquid absorbing material and the filler in an amount such that the animal litter composition has a total oil content of about 1.5% by weight to about 7.0% by weight based on the total weight of the animal litter composition.

Example 1

Testing was carried out to characterize adhesion reduction resulting from the addition of an oil to animal litter compositions. Tested compositions were: 100% sodium bentonite with a particle size range of 0.40 to 1.68 mm; ARM & HAMMER™ CLUMP & SEAL™ brand litter (commercially available) with a particle size range of 0.25 to 1.68 mm; ARM & HAMMER™ Double Duty brand litter (commercially available) with a particle size range of 0.15 mm to 3.36 mm; and TIDY CATS® 24/7 brand clumping litter (commercially available).

Each tested material was provided in a conventional litter box and an oil was combined therewith. Tested oils included silicone oil, mineral oil, grapeseed, and corn oil. In separate tests, the oil was included in an amount of 1% by weight, 2% by weight, or 5% by weight based on the total weight of the litter material plus the oil. Testing was carried out to determine a degree of efficacy at allowing a release of waste litter. Efficacy was determined by subjecting each test material to a 2% sodium chloride solution, which acted to represent a wetting action of cat urine. The stream of solution was adjusted to contact the corner of the litter box at a product/pan interface. Applying the solution in such a manner created the opportunity to form a clump in contact with the litter box. The litter boxes were allowed to set for at least 24 hours after which they were inverted to dump out the contents. Observations were made of the performance for each formulation variable taking into account the amount of litter left behind in the litter box using an observable scale of 0-5, with a score of 5 indicating a full release of litter waste from the litter box so that no residue remains and a score of 0 indicating that clumps of litter waste remained in the box after hard strike (i.e., knocking and/or otherwise hitting the box). In instances where clump formation was extremely irregular, the variant includes an "f" for failure. The effectiveness is demonstrated via the observations noted in TABLE 2 below.

TABLE 2

Non-Stick Ratings

| Oils | % | 100% Bentonite Rating | C&S 50/50 Rating | DD 50/50 Rating | TC24/7 Rating |
| --- | --- | --- | --- | --- | --- |
| Mineral Oil | 1 | f | 3 | 4 | 0-1 |
| Orchex 796 | 2 | f | 3 | 4 | 5 | 0-1 |
|  | 5 |  | 5 | 4 | 4 | 4 |
| Silicone Oil | 1 |  | 5 | f | 0 | 5 | 0 |
| ZRM 1196 | 2 | f | 5 | f | 5 | f | 3 | 4 |
|  | 5 |  | 4 | f | 3 | f | 4 | 5 |
| Grapeseed | 1 |  | 3 | 3 | 1 | 0 |
| Oil | 2 |  | 3 | 3 | 3 | 2 |
|  | 5 |  | 3 | 3 | 4 | 5 |
| Corn Oil | 1 | f | 0 | f | 0 | 4 | 0 |
|  | 2 | f | 0 | f | 0 | 5 | 0 |
|  | 5 | f | 0 |  | 3 | 4 | 0 |

Test results indicated that efficacy at allowing the release of waste litter may be correlated to the hydrophobicity of the added oil: silicone oil>mineral oil>grapeseed oil>corn oil. Testing also showed other differences in performance as seen in the table below, where an indication of 'SHP' indicated that a surface of the litter was slightly hydrophobic, an indication of 'MHP' indicated that a surface of the litter was moderately hydrophobic, an indication of 'VHP' indicated that a surface of the litter was very hydrophobic, and an indication of 'Mixed HP' indicated that a surface of the litter was of mixed hydrophobicity. Ratings and Observations from 24 Hour Non-Stick Tests related to oil effects are shown in Tables 3a and 3b.

TABLE 3a

| Oils | Wt % | 100% Bentonite | | | C&S 50/50 | | |
|---|---|---|---|---|---|---|---|
| | | | Rating | Comments | | Rating | Comments |
| Mineral Oil Orchex 796 | 1 | — | 3 | MHP, clumps formed just at surface | — | 4 | Clumps fell out but dry clay residue remained |
| | 2 | — | 3 | VHP, clumps formed just at surface | — | 4 | |
| | 5 | — | 5 | SHP, clumps formed at surface and in bed | — | 4 | Oily residue but clumps slid out |
| Silicone Oil ZRM 1196 | 1 | — | 5 | MHP, clumps formed just at surface | f | 0 | VHP, clumps formed just at surface |
| | 2 | — | 5 | MHP, clumps formed just at surface | f | 5 | VHP, clumps formed just at surface |
| | 5 | — | 4 | MHP, clumps formed just at surface | f | 3 | VHP, clumps formed on surface and inside |
| Grapeseed Oil | 1 | — | 3 | MHP, clumps formed mostly at surface | — | 3 | VHP |
| | 2 | — | 3 | MHP, clumps formed mostly at surface | — | 3 | VHP |
| | 5 | — | 3 | SHP, clumps formed mostly at surface | — | 3 | Mixed HP |
| Corn Oil | 1 | f | 0 | VHP, clumps formed mostly at surface | f | 0 | HP |
| | 2 | f | 0 | VHP, clumps formed mostly at surface | f | 0 | HP |
| | 5 | f | 0 | VHP, clumps formed mostly at surface | | 3 | Absorbs |

TABLE 3b

| Oils | Wt % | DD 50/50 | | | TC 24/7 | |
|---|---|---|---|---|---|---|
| | | | Rating | Comments | Rating | Comments |
| Mineral Oil Orchex 796 | 1 | | 4 | | 0-1 | Absorbs |
| | 2 | | 5 | | 0-1 | Absorbs |
| | 5 | | 4 | Oily residue but clumps slid out | 4 | Oily residue |
| Silicone Oil ZRM 1196 | 1 | | 5 | MHP | | SHP |
| | 2 | f | 3 | VHP | | Solution sank to bottom of pan |
| | 5 | f | 4 | Mixed HP | | Solution sank to bottom of pan |
| Grapeseed Oil | 1 | | 1 | Absorbs | 0 | Solution sank to bottom of pan |
| | 2 | | 3 | Absorbs | 2 | Solution sank to bottom of pan |
| | 5 | | 4 | Absorbs, oily residue | 5 | Solution sank to bottom of pan |
| Corn Oil | 1 | | 4 | Absorbs | 0 | Absorbs |
| | 2 | | 5 | Absorbs | 0 | Absorbs |
| | 5 | | 4 | Absorbs, oily residue | 0 | Absorbs |

As indicated in the data shown in TABLE 3a and TABLE 3b, the ability of the noted oils to improve release of the litter has been demonstrated. Testing also showed that further characteristics of the animal litter were partially determinate of efficacy Example 2

Preliminary testing was carried out to characterize adhesion reduction resulting from the addition of mineral oil to non-clumping animal litter compositions. Tested compositions were as follows: FRESH STEP® brand non-clumping litter (commercially available) and TIDY CATS® 24/7 brand non-clumping litter (commercially available). The particle size range for each tested composition was not determined at the time of testing.

Each tested material was provided in a conventional litter box and a mineral oil was combined therewith to determine a degree of efficacy at allowing a release of waste litter. The tested mineral oil was as follows: ORCHEX® 796. In separate tests, the oil was included in an amount of 3% by weight based on the total weight of the litter material plus the oil. Additionally, each litter composition was separately tested, without the addition of mineral oil, in order to provide a baseline comparison as to the effectiveness of adding mineral oil to a litter composition to reduce adhesion. Efficacy was determined by subjecting each test material to a 2% sodium chloride solution, which acted to represent a wetting action of cat urine. The stream of solution was adjusted to contact the corner of the litter box at a product/pan interface. Applying the solution in such a manner created the opportunity to form a clump in contact with the litter box. The litter boxes were allowed to set for at least 72 hours after which they were inverted to dump out the contents. Observations were made of the performance for each formulation variable taking into account the amount of litter left behind in the litter box using an observable scale of 0-5, with a score of 5 indicating a full release of litter waste from the litter box so that no residue remains and a score of 0 indicating that clumps of litter waste remained in the box after hard strike (i.e., knocking and/or otherwise hitting the box). The effectiveness is demonstrated via the observations noted below.

TABLE 4

Non-Stick Ratings-72 Hour Non-Stick Test

| Oils | % | Fresh Step-Non-Clumping Rating | TC 24/7 Non-Clumping Rating |
|---|---|---|---|
| Mineral Oil | 0 | 3 | 3 |
| Orchex 976 | 3 | 5 | 3 |

Example 3

A spread test was carried out in order to test a hydrophobicity of varying types of oils. Tested oils were as follows: silicone oil, mineral oil (i.e., ORCHEX®796), grapeseed oil, and corn oil. Pieces of high-density polyethylene (HDPE) were individually coated with each tested oil and subjected to a 10 µL drop of aqueous fluid. Pieces of HDPE not coated in oil were also subjected to a 10 µL drop of aqueous fluid. Three aqueous fluids were tested, which included: deionized water, a 2% sodium chloride solution, and cat urine.

Measurements of a drop diameter of the drop after being dropped on each coated HDPE specimen were measured at a base of the drop using a microscope, and then recorded as indicated below in TABLE 5. The drop diameter measurements are provided in µm.

TABLE 5

| | Silicone | ORCHEX ® 796 | Grapeseed Oil | Corn Oil | No Oil |
|---|---|---|---|---|---|
| DI Water | | | | | |
| Average | 3458 | 3614 | 4255 | 4223 | 3550 |
| Error | 243 | 214.6 | 53.2 | 347.7 | 115.9 |
| 2% NaCl | | | | | |
| Average | 3260 | 3928 | 4046 | 4498 | 3840 |
| Error | 11 | 10 | 22.5 | 188 | 182.5 |
| Cat Urine | | | | | |
| Average | 3603 | 4226 | 4558 | 4752 | 3780 |
| Error | 20 | 255.1 | 83.5 | 222.5 | 136 |

Based on the above data, it was noted that silicone oil and ORCHEX®796 resulted in impart diameters for all three aqueous liquids, indicating that each of these tested aqueous fluids may not adhere as well to these two types of oil. Accordingly, the data yielded a preliminary conclusion that the wider the measured drop diameter, then the more the drop spread, which was indicative of better wetting.

Many modifications and other embodiments of the disclosure set forth herein will come to mind to one skilled in the art to which these disclosure pertain having the benefit of the teachings presented in the foregoing descriptions. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An animal litter composition comprising:
   a clay-based liquid absorbing material having a surface area of about 15 m²/g or less;
   a filler comprising one or both of the following: a non-absorbent, non-soluble substrate;
   an absorbent substrate; and
   at least one oil.

2. The animal litter composition of claim 1, wherein the at least one oil is present in an amount such that the animal litter composition has a total oil content of about 0.5% by weight to about 8% by weight, based on the total weight of the animal litter composition.

3. The animal litter composition of claim 2, wherein the total oil content is about 1.25% by weight to about 7.5% by weight, based on the total weight of the animal litter composition.

4. The animal litter composition of claim 2, wherein the total oil content is about 1.5% by weight to about 3% by weight based on the total weight of the animal litter composition.

5. The animal litter composition of claim 1, wherein the at least one oil is present in an amount such that the animal litter composition has a total oil content of greater than 1% by weight, based on the total weight of the animal litter composition.

6. The animal litter composition of claim 1, wherein the at least one oil is present in an amount such that the animal litter composition has a total oil content of no greater than 10% by weight based on the total weight of the animal litter composition.

7. The animal litter composition of claim 1, further comprising a clumping agent.

8. The animal litter composition of claim 1, wherein the at least one oil comprises at least one of mineral oil, silicone oil, grapeseed oil, and corn oil.

9. The animal litter composition of claim 1, wherein the clay-based liquid absorbing material has a surface area of about 10 m²/g or less.

10. The animal litter composition of claim 1, wherein the clay-based liquid absorbing material has a surface area of about 2 m²/g to about 15 m²/g.

11. The animal litter composition of claim 1, wherein the clay-based liquid absorbing material has an average particle size of about 0.1 mm to about 5 mm.

12. The animal litter composition of claim 1, wherein the clay-based liquid absorbing material in present in an amount of about 35% to about 55% by weight, and the filler is present in an amount of about 40% to about 60% by weight, based on the total weight of the animal litter composition.

13. A method for producing an animal litter composition, the method comprising:
   providing a clay-based liquid absorbing material having a surface area of about 15 m²/g or less and a filler comprising one or both of the following: a non-absorbent, non-soluble substrate; an absorbent substrate; and
   incorporating at least one oil with the clay-based liquid absorbing material and the filler.

14. The method of claim 13, wherein the at least one oil is incorporated in an amount such that the animal litter composition has a total oil content of about 0.5% by weight to about 8% by weight, based on the total weight of the animal litter composition.

15. The method of claim 14, wherein the total oil content is about 1.25% by weight to about 7.5% by weight based on the total weight of the animal litter composition.

16. The method of claim 13, wherein the at least one oil is incorporated in an amount such that the animal litter composition has a total oil content of greater than 1% by weight, based on the total weight of the animal litter composition.

17. The method of claim 13, further comprising coating a clumping agent on the non-absorbent, non-soluble substrate prior to incorporating the at least one oil.

18. The method of claim 13, wherein the at least one oil comprises at least one of mineral oil, silicone oil, grapeseed oil, and corn oil.

19. The method of claim 13, wherein the clay-based liquid absorbing material has a surface area of about 10 $m^2/g$ or less.

* * * * *